United States Patent [19]

Nakamura et al.

[11] Patent Number: 5,093,611
[45] Date of Patent: Mar. 3, 1992

[54] OUTPUT CIRCUIT FOR PORTABLE GENERATORS

[75] Inventors: Masashi Nakamura; Shigeru Fujii, both of Wako, Japan

[73] Assignee: Honda Giken Kogyo Kabushiki Kaisha, Tokyo, Japan

[21] Appl. No.: 554,194

[22] Filed: Jul. 17, 1990

[30] Foreign Application Priority Data

| Jul. 20, 1989 | [JP] | Japan | 1-85360[U] |
| Jul. 20, 1989 | [JP] | Japan | 1-85361[U] |
| Jul. 20, 1989 | [JP] | Japan | 1-85362[U] |
| Sep. 5, 1989 | [JP] | Japan | 1-230908 |

[51] Int. Cl.$^5$ ............................................... B23K 9/10
[52] U.S. Cl. ................................. 322/90; 219/133; 307/16; 322/28
[58] Field of Search ............... 322/90, 94, 28; 307/16; 219/133

[56] References Cited

U.S. PATENT DOCUMENTS

| 4,015,188 | 3/1977 | Denis | 322/28 |
| 4,465,920 | 8/1989 | Hoyt, Jr. et al. | 219/133 |
| 4,999,563 | 3/1991 | Suzuki | 322/90 |

Primary Examiner—R. J. Hickey
Attorney, Agent, or Firm—Charles S. McGuire

[57] ABSTRACT

An output circuit for a portable generator having a plurality of output windings provided separately from each other, and control winding provided separately from the output windings. A plurality of thyristor bridge circuits each having thyristors are connected respectively to the output windings. A superposing circuit superposes outputs from the thyristor bridge circuits one upon another to provide a first superposed output voltage. A rectifier circuit is connected to the control winding. The rectifier circuit is disposed such that its output voltage is superposed upon the first superposed output voltage to provide a second superposed output voltage. A control circuit is responsive to the second superposed output voltage for concurrently controlling voltages applied respectively to the gates of the thyristors of the thyristor bridge circuits to thereby maintain the first superposed output voltage at a constant value. An FET is connected to the output of the superposing circuit, and is connectible in series to an external load, for controlling supply of current flowing through the FET to the external load. A current cut-off circuit detects overcurrent in the output circuit and operable, upon detection of the overcurrent, to cause the FET to be turned off to thereby cut off the supply of current to the external load.

10 Claims, 2 Drawing Sheets

OUTPUT CIRCUIT FOR PORTABLE GENERATORS

BACKGROUND OF THE INVENTION

This invention relates to an output circuit for portable generators, and more particularly to an output circuit for compact portable generators which supply high direct current output power.

Portable generators which are designed to supply high output power are generally required to have an output winding formed of coils large in diameter, and full consideration should be given such that an insulator which insulates the coils of the output winding are formed of a material which can withstand high voltage and large current.

In a portable generator which meets these requirements, such as one generating 30-40 A of direct current, an output winding having a large coil diameter has to be wound on a small stator core, which requires the use of a coil winding machine which is capable of winding with a large tensile force. Besides, large capacity type and large sized semiconductor components have to be used to control the output voltage from the generator, which makes the control circuit large in size and complicated in structure.

On the other hand, a generator for welding purposes as proposed by Japanese Provisional Utility Model Publication (Kokai) No. 62-142473 comprises two sets of output windings which are disposed to have their respective outputs combined together, only one output of which is controlled by means of a chopper such that welding current, i.e. the combined output can vary from a small value to a large value. This proposed generator can avoid an increase in the coil diameter of the output windings, and also enables designing the control circuit compact in size. However, the proposed generator is not capable of maintaining the output voltage at a constant level as required of a general purpose generator which supplies direct current.

In portable generators in general, the output circuit is provided with an overcurrent detector formed e.g. of a shunt resistance, in order to detect overcurrent due to overload on the circuit, which detector is connected in series with a load device such that when overcurrent is detected by the overcurrent detector, the supply of output current to the load device is cut off. However, the overcurrent detector is always supplied with part of output current supplied to the load device, there is power loss. Particularly in a generator which is required to supply high current output power such power loss is large and not negligible.

On the other hand, a device is known e.g. from Japanese Provisional Patent Publications (Kokai) Nos. 58-43016 and 64-83156, in which an FET (field effect transistor) as a switching element is connected in series to a load, and a voltage drop across the source and drain of the FET during conduction, which is caused by resistance between the source and the drain, is detected as a detected value of output current to thereby control the degree of conduction of the FET. If the technique of this proposed device is applied to the above proposed output circuit for portable generators, it should be possible to reduce the power loss.

Certainly, if the FET is employed in the output circuit of the portable generator, the supply of output current to the load can be cut off when excessive output current is detected to thereby protect the generator including the output circuit. However, if the overcurrent detection is repeated in such a manner that while the engine which drives the generator continues operating, the load device connected to the output circuit of the generator is disconnected therefrom to release the current supply cut-off state, and then the load device is again connected to the output circuit to bring the latter into an overloaded state and hence again effect cutting-off of the current supply, such repeated disconnection and connection can impair the generator and the load device.

Depending upon the structure of the load device, there is a possibility that the cause of overcurrent due to the load vanishes when the supply of output current from the generator is cut off upon detection of overcurrent (for example, a case where overcurrent is caused by part of the load device becoming hot) so that shortly after output current is again supplied from the generator, overcurrent again takes place. Therefore, the possibility is rather high that the occurrence of overcurrent due to such cause cannot be easily recognized by the driver of a vehicle in which the engine and the generator are installed, and the generator and the load device are impaired before the overcurrent is recognized by the driver.

Generally, the above output current cut-off is not effected immediately upon detection of an overcurrent state (overloaded state), but it is effected after such state has lasted over a short time period. This increases the possibility of damage to the generator and the load device.

Furthermore, if a smoothing capacitance is connected to the input side of the FET used in the output circuit for cutting off the output current supply upon occurrence of overcurrent, the smoothing capacitor is suddenly discharged to apply large current to the FET to impair same in the event that there occurs a short circuit across the load device or a battery to be charged by the generator, which is also a load device, is connected in reverse polarity to the output circuit.

SUMMARY OF THE INVENTION

It is an object of the invention to provide an output circuit for portable generators, which is simple in structure but is capable of supplying high output power and stably controlling the output voltage with high accuracy.

It is a further object of the invention to provide an output circuit for portable generators, which is capable of positively making the driver recognize the occurrence of overcurrent and making it unnecessary to repeatedly cut off the output current to thereby prevent the generator and the load device from being impaired, and on the other hand, which inhibits cutting-off of the output current at the start of the generator, to thereby avoid inconveniences to be caused by cutting-off of the output current.

It is another object of the invention to provide an output circuit for portable generators, which has reduced power loss, compact in size and low in manufacturing cost.

A still further object of the invention is to prevent damage to the generator and the load device due to overcurrent caused by a short circuit across the load device or connection of a battery as a load device in reverse polarity to the output circuit.

To attain the above objects, the present invention provides an output circuit for a portable generator having a plurality of output windings provided separately from each other, and a control winding provided separately from the output windings.

The output circuit according to the present invention is characterized by an improvement comprising: a plurality of thyristor bridge circuits, each having thyristors each of which has a gate, the thyristor bridge circuits being connected respectively to the output windings, a superposing circuit for superposing outputs from the thyristor bridge circuits one upon another to provide a first superposed output voltage, a rectifier circuit connected to the control winding, said rectifier circuit being disposed such that an output voltage therefrom is superposed upon said first superposed output voltage from said superposing circuit to provide a second superposed output voltage, and a control circuit responsive to said second superposed output voltage for concurrently controlling voltages applied respectively to the gates of the thyristors of the thyristor bridge circuits, to thereby maintain said first superposed output voltage from said superposing circuit at a constant value.

The output circuit may further include a field effect transistor having a source terminal and a drain terminal and connected to an output of the superposing circuit, and connectible in series to an external load, for controlling supply of current flowing through the field effect transistor to the external load, and a current cut-off circuit for detecting overcurrent in the output circuit and operable, upon detection of the overcurrent, to cause the field effect transistor to be turned off for cutting off supply of current to the external load.

The current cut-off circuit detects the overcurrent by comparing a voltage between the source terminal and the drain terminal of the field effect transistor with a predetermined value.

The current cut-off circuit judges that the overcurrent exists if the voltage between the source terminal and the drain terminal exceeds the predetermined value.

The current cut-off circuit causes the field effect transistor to be turned off when a predetermined time period elapses from a time point the voltage between the source terminal and the drain terminal exceeds the predetermined value.

The current cut-off circuit causes the field effect transistor to be turned off when a state in which the voltage between the source terminal and the drain terminal exceeds a first predetermined value has lasted over a predetermined time period, and immediately causes the field effect transistor to be turned off when the voltage between the source terminal and the drain terminal exceeds a second predetermined value higher than the first predetermined value.

The output circuit may include a smoothing capacitance connected to the output of the superposing circuit, in parallel to a series circuit formed of the field effect transistor and the external load. The current cut-off circuit detects the overcurrent by comparing a voltage across the smoothing capacitance with a predetermined value.

The current cut-off circuit judges that the overcurrent exists if the voltage across the smoothing capacitance is below the predetermined value.

The the current cut-off circuit continues cutting off supply of current to the external load until a resetting action is taken.

The generator is connected to an engine to be driven thereby. The current cut-off circuit causes the field effect transistor to be turned on when the rotational speed of the engine exceeds a predetermined value.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
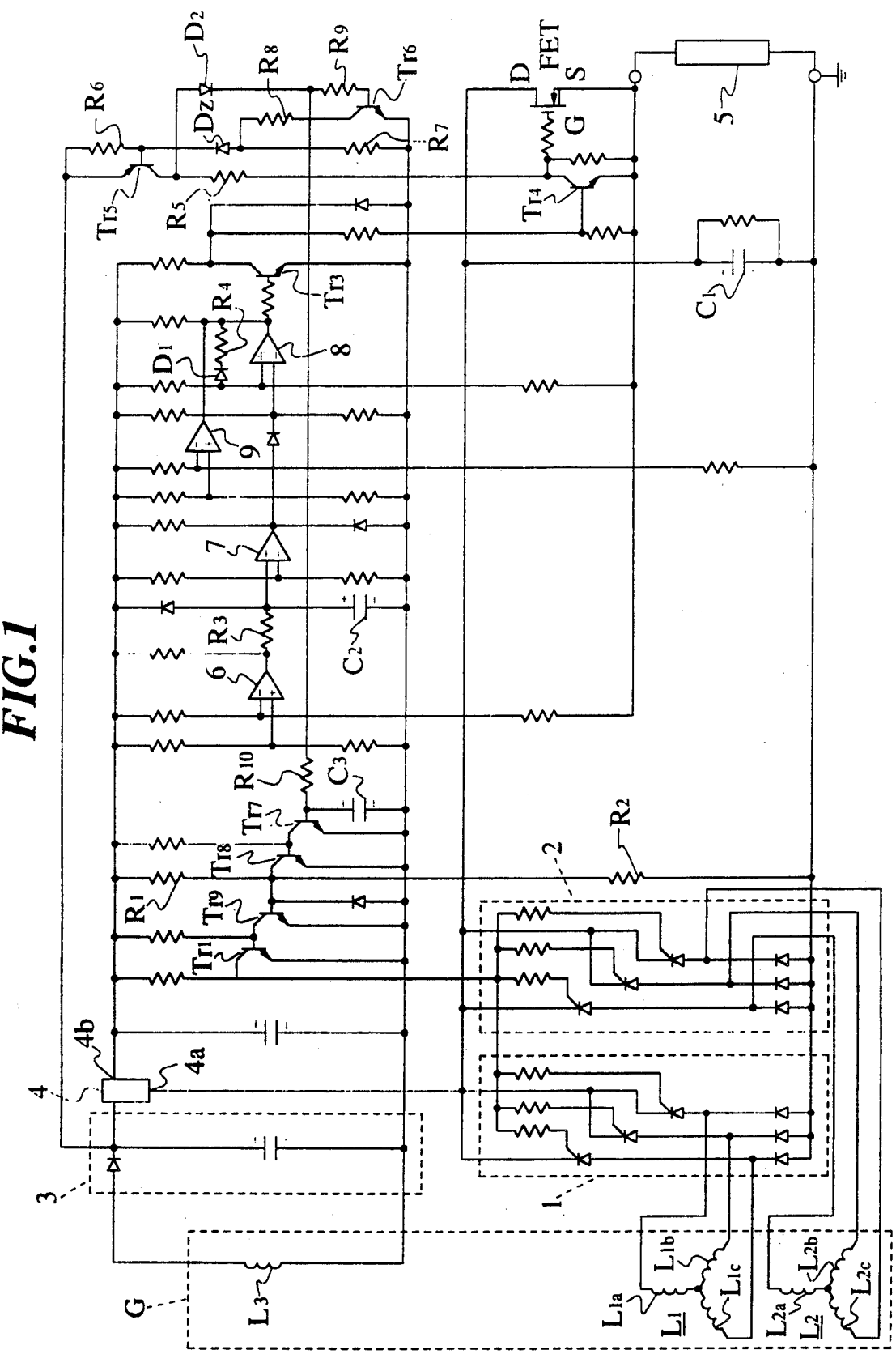
FIG. 1 is a circuit diagram showing the whole arrangement of an output circuit for a portable generator according to the invention.

Referring first to FIG. 1, there is shown the overall arrangement of an output circuit for a portable generator according to an embodiment of the invention. In the figure, reference character G designates an alternating-current generator which is adapted to be driven by an engine, not shown, and comprises first and second output windings L1, L2, and a control winding (auxiliary winding) L3. The first and second output windings L1, L2 and the control winding L3 are wound on a common stator core, not shown, having a plurality of salient poles.

Figure 2:
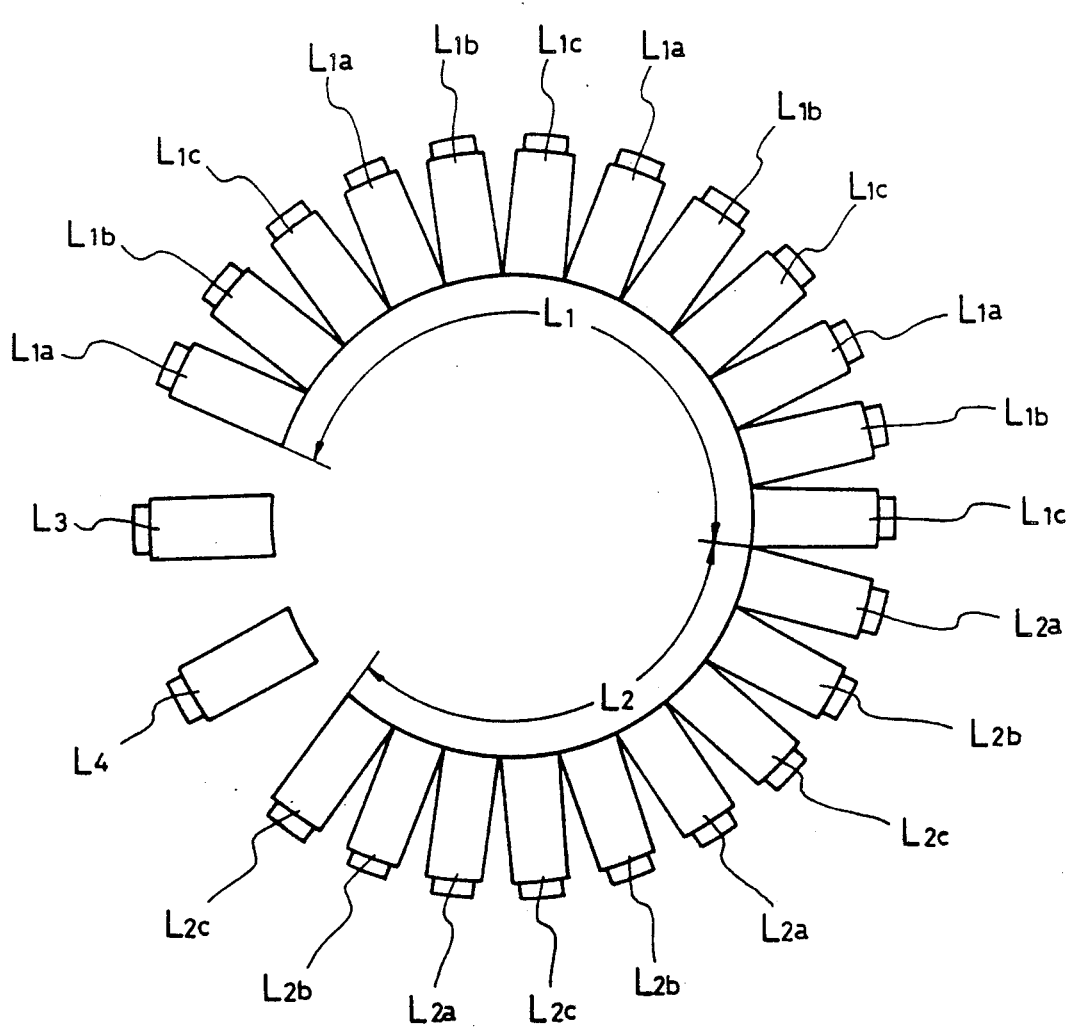
FIG. 2 is a schematic diagram showing the arrangement of output windings and control winding in the generator.

The alternating-current generator G is a so-called outer rotor type, which has a magnet rotor, not shown, arranged around the stator core. The magnet rotor is driven by the engine for rotation about the stator core. As shown in FIG. 2, the first output winding L1 comprises four sets of windings, each set comprising three windings L1$a$, L1$b$, and L1$c$ wound respectively on associated salient poles of the stator, so as to supply three-phase current. On the other hand, the second output winding L2 comprises three sets of windings, each set comprising three windings L2$a$, L2$b$, and L2$c$ wound respectively on associated salient poles of the stator, which are other than those of the first output winding L1, so as to supply three-phase current. Besides, the control winding L3 is wound on one salient pole other than those of the first and second output windings L1, L2. A winding L4 is provided exclusively for supplying current to a power supply for an ignition device of the engine. With such arrangement, when the magnet rotor is rotated about the stator core by the engine, three-phase alternating currents are supplied respectively by the first and second output windings L1, L2, whereas single-phase alternating currents are supplied respectively by the control winding L3 and the winding L4.

Referring again to FIG. 1, the first and second output windings L1 and L2 are connected respectively to thyristor bridge circuits 1 and 2, each formed by thyristors and diodes, to supply the thyristor bridge circuits, 1, 2 with three-phase currents generated thereby. The thyristor bridge circuits 1, 2 subject the respective three-phase alternating currents to full wave rectification, as well as voltage regulation, as hereinafter referred. Respective outputs of the thyristor bridge circuits 1, 2 are joined together and connected to a smoothing capacitance C1. Consequently, the rectified or direct currents from the bridge circuits 1, 2 are superposed one upon the other and the combined output is then subjected to smoothing by the smoothing capacitance C1 to be supplied as direct current output.

The control winding L3 is connected to a rectifier circuit 3 which is in turn connected to a three-terminal constant-voltage regulator 4, so that the single-phase alternating current is rectified by the rectifier circuit 3 and then the rectified or direct current is stabilized to constant voltage by the constant-voltage regulator 4. The constant-voltage regulator 4 has an input/output common terminal 4a connected to a positive terminal of the smoothing capacitance C1, whose negative terminal is grounded. As a consequence, provided that a voltage across the smoothing capacitance C1 is 12 volts and an output voltage from the constant-voltage regulator 4 is 8 volts, the potential at the terminal 4a of the regulator 4 is 12 volts, and the potential at an output terminal 4a thereof is 20 volts.

Transistors Tr1 and Tr2 are connected to the thryistor bridge circuits 1, 2 and the constant-voltage regulator 4 to adjust input voltage applied to the gate terminals of the thyristors of the thyristor bridge circuits 1, 2. The transistor Tr2 is supplied at the base thereof with voltage which results from a division of voltage between the output terminal 4b of the constant-voltage regulator 4 and the negative terminal of the smoothing capacitance C1 by resistances R1 and R2. The voltage supplied to the transistance Tr2 reflects the voltage across the capacitance C1, i.e. direct current output voltage supplied to a load device 5. The transistor Tr1 has its collector connected to the gate terminals of the thyristors of the thyristor bridge circuits 1, 2 through resistances.

With such arrangement, in each thyristor bridge circuit 1, 2, the supplied alternating current from the output winding L1, L2 is rectified by the corresponding thyristor only when the same thyristor is supplied with a high level portion of the current at its gate terminal. The rectified currents from the thyristor bridge circuits 1, 2 are superposed one upon the other and smoothed by the smoothing capacitance C1, to be supplied as direct current output to the load device 5.

When the voltage across the smoothing capacitance C1 is low, the transistor Tr2 has an increased potential at the base to be turned on, thereby turning the transistor Tr1 off. Upon turning-off of the transistor Tr1, the thyristors of the thyristor bridge circuits 1, 2 are supplied with high level voltage at the gate terminals thereof so that the thyristors are turned on to supply the respective rectified currents from the thyristor bridge circuits 1, 2 to the smoothing capacitance C1. On the other hand, when the voltage across the smoothing capacitance C1 is high, the transistors Tr1 and Tr2 operate in the reverse manner to the above, to turn off the thyristors of the thyristors bridge circuits 1, 2 to interrupt rectifying the alternating currents from the output windings L1, L2, thereby supplying no current to the smoothing capacitance C1. As the above actions are repeated, the voltage across the smoothing capacitance C1 is maintained almost constant.

As described above, the thyristors of the thyristor bridge circuits 1, 2 each have an angle of conduction thereof, i.e. on-period thereof controlled in response to a variation in the output voltage in place of controlling the difference in phase angle between the alternating currents. Since the angle of conduction is varied even with a slight variation in the generator output voltage due to a ripple therein, etc., highly precise output voltage regulation is realized.

Further, since the two thyristor bridge circuits 1, 2 are not separately controlled, but the same or common voltage is applied to the gates of the thyristors of the both thyristor bridge circuits 1 and 2, the output circuit can be simplified in structure with a reduced manufacturing cost and improved reliability. In addition, output current is equally supplied to the load device from the thyristor bridge circuits 1, 2.

Since the output winding is formed by two separate windings, i.e. the first and second windings L1 and L2, the amount of generation to be shared by each winding can be reduced to almost a half of the conventional one, thereby enabling to use windings with a reduced coil diameter, and hence making it unnecessary to use a coil winding machine with a large tensile force as well as facilitating drawing out and arranging output windings. Besides, this also enables to use thyristor bridge circuits, etc. with reduced maximum allowable current.

Although, in the above described embodiment, the output winding is formed by two windings i.e. the first and second windings L1 and L2, the invention is not limited to such arrangement. Alternatively, the output windings may be formed by a plurality of independent windings to reduce the output capacity of individual windings, according to necessity.

Referring again to FIG. 1, a field effect transistor, preferably formed by a power MOS FET (hereinafter referred to as "FET") has its drain connected to the positive terminal of the smoothing capacitance C1, and its source connectible to the load device 5 as an external load, to serve as breaker means for cutting off overcurrent caused by overloading. The source-to-drain voltage of the FET varies in proportion to source-to-drain saturation current thereof so that, when a large current load is connected as the load 5 to increase the output current from the output circuit, a large voltage drop is developed between the source and drain of the FET.

The output circuit includes three comparators 6, 7, and 8 serially connected to each other on the output side of the constant-voltage regulator 4. The comparator 6 has an inverting input terminal connected to the output terminal 4b of the constant-voltage regulator 4 through a resistance as well as to the source of the FET, and an output terminal thereof connected to a non-inverting input terminal of the comparator 7 through a time-constant circuit formed by a resistance R3 and a capacitance C2. Reference voltages are applied respectively to a non-inverting input terminal of the comparator 6, an inverting input terminal of the comparator 7, and an inverting input terminal of the comparator 8. These three reference voltages are created by dividing the output voltage from the voltage constant-voltage regulator 4 by respective dividing resistances. The input/output common terminal 4a of the constant-voltage regulator 4 is connected to the drain of the FET, as mentioned hereinbefore. The comparator 7 has an output terminal thereof connected to the inverting input terminal of the comparator 8 via a diode for preventing reverse current. The comparator 8 has a non-inverting input terminal connected to the output terminal 4b of the constant-voltage regulator 4 via a resistance, and to the source of the FET via a resistance. An output terminal of the comparator 8 is connected to the gate of the FET through switching transistors Tr3 and Tr4.

The circuit portion constructed as above operates as follows when overcurrent flows through the load device:

When no overcurrent flows through the load device 5, and accordingly the voltage drop between the source and drain of the FET is smaller than a predetermined value, the potential at the inverting input terminal of the comparator 6 is higher than that at the non-inverting input terminal thereof so that the comparator 6 supplies a low level signal to the comparator 7. Accordingly, the comparator 7 supplies a low level signal to the comparator 8. Then, the potential at the non-inverting input terminal of the comparator 8 is higher than that at the inverting input terminal, so that the comparator 8 supplies a high level signal, thereby turning the transistor Tr3 on and turning the transistor Tr4 off. As a consequence, the FET has its gate supplied with a high level signal to be turned on.

On the other hand, when overcurrent flows through the load device 5, such as when an abnormally large load is connected to the output circuit, so that the voltage drop between the source and drain of the FET is in excess of the predetermined value, the potential at the inverting input terminal of the comparator 6 is lower than that at the non-inverting input terminal so that the comparator 6 supplies a high level signal. So long as this high output state continues, the capacitance C2 is charged by the high output from the comparator 6 through the resistance R3. When a predetermined time period defined by the time constant determined by the elements R3 and C2 elapses, the potential at the non-inverting input terminal of the comparator 7 becomes higher than the potential (reference voltage) at the inverting input terminal of same, so that the comparator 7 supplies a high level signal. Consequently, the potential at the inverting input terminal of the comparator 8 goes high with a time lag corresponding to the predetermined time period, whereas the potential at the non-inverting input terminal of same is low due to the large voltage drop between the source and drain of the FET, and accordingly the comparator 8 generates a low level signal to turn the transistor Tr3 off and turn the transistor Tr4 on, whereby the gate of the FET is supplied with a low level signal to be turned off. Incidentally, the constants related to the comparator 8 are set such that the low potential at the non-inverting input terminal thereof alone does not cause the comparator 8 to generate a low level signal, so long as the low potential is within a certain level range.

Thus, overcurrent is allowed to flow in the output circuit over the predetermined time period determined by the time constant of the resistance R3 and the capacitance C2, but is inhibited from further flowing after the predetermined time period elapses, By providing the predetermined time period, instantaneous occurrence of overcurrent is ignored to thereby secure stable operation of the FET of preventing overcurrent.

The comparator 8 per se is adapted to generate a low level signal when the voltage drop between the source and drain of the FET exceeds a value larger than the value to be detected by the comparator 6. More specifically, while the comparator 6 acts to cause the FET to be turned off when a first predetermined amount or more of overcurrent has lasted over a predetermined time period, the comparator 8 acts to immediately cause the FET to be turned off when a second predetermined amount or more of overcurrent, which is substantially higher than the first predetermined amount, has occurred.

Further, the output circuit includes a comparator 9 which has an inverting input terminal to which are connected the negative terminal of the capacitance C1, as well as the output terminal of the constant-voltage regulator 4 through respective resistances, and an output terminal thereof connected to the transistor Tr3. The comparator 9 has a non-inverting input terminal supplied with a reference voltage which is obtained by dividing the output voltage from the constant-voltage regulator 4. This reference voltage is normally set at a higher level than the potential at the inverting input terminal of the comparator 9 such that the comparator 9 generates a high level signal when there is no overcurrent. As mentioned before, the input/output common terminal 4a of the constant-voltage regulator 4 is connected to the positive terminal of the capacitance C1.

The comparator 9 arranged as above operates as follows: In the event that the capacitance C1 is suddenly discharged, such as when there occurs a short circuit across the external load device 5 or when a battery as the external load device 5 is connected in reverse polarity to the output circuit, the voltage across the capacitance C1 suddenly drops so that the potential at the inverting input terminal of the comparator 9 rises above the potential at the non-inverting input terminal thereof. Accordingly, the comparator 9 immediately generates a low level signal so that the transistor Tr3 is turned off and the transistor Tr4 is turned on, thereby turning the FET off immediately. Consequently, overcurrent from the capacitance C1 is prevented from flowing through the FET to the external load device 5, whereby excessive burden on the parts C1, FET can be reduced.

Further, the output circuit according to the invention also includes the following construction:

A diode D1 has its anode connected to the non-inverting input terminal of the comparator, 8, and its cathode connected to the output terminal of the comparator 8 through a resistance R4.

A switching transistor Tr5 has its emitter connected to the output terminal of the rectifier circuit 3 and its collector connected to the collector of the transistor Tr4 through a resistance R5. Resistance R6 is connected between the emitter and base of the transistor Tr5. A Zener diode Dz has its cathode connected to the base of the transistor Tr5, and its anode connected to the terminal 4a of the constant-voltage regulator 4 through a resistance R7. Further, connected in parallel to the resistance R7 is a series circuit formed of a resistance R8 having a resistance value smaller than the resistance R7 and a switching transistor Tr6. Connected through a resistance R9 to the base of the transistor Tr6 is the cathode of a diode D2 which in turn has its anode connected through a resistance R10 to the base of a switching transistor Tr7. Connected between the base of the transistor Tr7 and the terminal 4a of the constant-voltage regulator 4 is a capacitance C3 which cooperates with the resistance R10 to form a time constant circuit. The transistor Tr7 has its collector connected to the base of a switching transistor Tr8 which in turn has its collector connected to the base of the transistor Tr2.

The operation of the above described portion of the output circuit is as follows:

During a normal state where no overcurrent flows through the FET, as stated before, the potential at the non-inverting input terminal of the comparator 8 is higher than the reference voltage applied to the inverting input terminal thereof so that the output from the comparator 8 is high. On the other hand, when the aforementioned first amount or more of overcurrent has lasted over the predetermined time period, or when the aforementioned second predetermined amount or more of overcurrent flows, the voltage between the source and drain of the FET rises so that the potential at the non-inverting input terminal of the comparator 8 drops below the reference voltage and hence the comparator 8 generates a low level signal, the diode D1 is turned on. While the diode D1 is energized, the potential at the non-inverting input terminal of the comparator 8 is maintained at a considerably lower level than the reference voltage. On this occasion, since the potential at the non-inverting input terminal of the comparator 8 is higher than that at the output terminal thereof, the diode D1 is kept energized. Thereafter, even when the overcurrent vanishes by removing the external load device 5, for example, so that the voltage between the source and drain of the FET drops, the potential at the non-inverting input terminal of the comparator 8 does not drop to a level as high as the reference voltage, and accordingly the comparator 8 continues generating the low level signal. Thus, once the FET has been turned off by the occurrence of overcurrent, it is kept off through the transistors Tr3, Tr4 due to the continued low level signal from the comparator 8.

To eliminate this output-cut off state, the driver has to take a resetting action of stopping the engine or the like to stop generation of power from the output windings 1, 2. So long as no such resetting action is taken, it is impossible to supply power to the external load device 5, thereby enabling the driver informed of the occurrence of overcurrent due to overload, without fail.

Such output-cut off operation is carried out similarly to the above, also when the FET is turned off by the aforedescribed action of the comparator 9.

Unless measures are taken, at the start of the generator, this function of cutting off the output brings about the phenomenon that if the external load device 5 is already connected to the output circuit when the generator installed in the engine is started, the voltage between the source and drain of the FET temporarily rises above a voltage value corresponding to the aforementioned second predetermined amount for discrimination of overcurrent, at an early time after the start of the generator. This causes the FET to be turned off, and besides, due to the action of the diode D1, the off state of the FET is maintained. This phenomenon is due to the fact that shortly after the start of the generator, the potential at the gate of the FET does not rise to a sufficient level, and accordingly the resistance between the source and drain of the FET is very high. On this unsaturated condition, if the external load device 5 is connected to the output circuit so that current flows through the FET, the voltage drop between the source and drain increases above a value corresponding to the aforementioned second predetermined value.

In view of the above-mentioned phenomenon occurring at the start of the generator, the output circuit according to the invention operates as follows, as the start of the generator:

The direct current output from the rectifier circuit 3 contains ripple. However, while the output voltage from the rectifier circuit 3 is low shortly after the start of the generator, the Zener diode Dz does never conduct, and accordingly there is no voltage drop across the resistance R6 and hence the transistor Tr5 does not conduct. Consequently, the voltage V1 at the junction between the diode D2 and the resistance R9 is at low level, whereby the transistor Tr7 is off, the transistor Tr8 on, the transistor Tr2 off, and the transistor Tr1 on, respectively, so that a low level signal is supplied to the thyristors of the thyristor bridge circuits 1, 2 to keep them off. Accordingly, no current flows between the source and drain of the FET, and hence the voltage therebetween is zero, whereby no overcurrent is detected.

Thereafter, as time elapses after the start of the generator, the output voltage from the rectifier circuit 3 progressively rises. When a peak of ripple components in the output from the rectifier circuit 3 exceeds a predetermined breakdown voltage of the Zener diode Dz, the latter conducts. The predetermined breakdown voltage is set at a value corresponding to the maximum voltage of ripple components in the output that is assumed when the rotational speed of the engine driving the generator reaches 3,000 rpm, for instance.

The conduction of the Zener diode Dz causes a voltage drop across the resistance R6 so that the transistor Tr5 is turned on to supply high level voltage to the gate of the FET to turn same on and hence decrease the resistance between the source and drain of the FET. At the same time, the junction voltage V1 rises to high level to cause the capacitance C3 to be charged through the resistance R10, so that upon the lapse of a predetermined time period (e.g. 0.5 seconds) determined by the time constant C3, R10, the transistor Tr7 is turned on, Tr8 off, Tr2 on, and Tr1 off, respectively, whereby the thyristor bridge circuits 1, 2 supply combined rectified current output to the smoothing capacitance C1. Since the resistance between the source and drain of the FET has been low since the predetermined time period before, the voltage between the source and drain is lower than a voltage value corresponding to the first predetermined value for discrimination of overcurrent, to thereby inhibit the FET from being turned off. In this way, even if the generator is started with the external load device 5 connected to the output circuit, the FET is never turned off even though no overcurrent flows.

In addition, the conduction of the Zener diode Dz and the transistor Tr5 causes the transistor Tr6 to be turned on so that the potential at the anode of the Zener diode Dz drops. Besides, since the resistance value of the resistance R8 is smaller than that of the resistance R7, the above potential drop is large. Therefore, once the Zener diode Dz has been turned on, it will never be turned off even if the minimum value of the ripple-containing output from the rectifier circuit 3 is applied thereto.

As described above, after the start of the generator and until the engine rotational speed reaches 3,000 rpm, for instance, the thyristor bridge circuits 1, 2 will never supply output. When the engine rotational speed rises above 3,000 rpm, for instance, the FET has its gate supplied with sufficiently high level voltage, and when a predetermined time period elapses thereafter, the thyristor bridge circuits 1, 2 start to supply output to the FET. Therefore, even if the generator is started with the external load device 5 connected to the output circuit, the FET will never be turned off or kept off.

What is claimed is:

1. An output circuit for a portable generator having a plurality of output windings provided separately from each other, and a control winding provided separately from said output windings, comprising: a plurality of thyristor bridge circuits, each having thyristors each of which has a gate, said thyristor bridge circuits being connected respectively to said output windings, a superposing circuit for superposing outputs from said thyristor bridge circuits one upon another to provide a first superposed output voltage, a rectifier circuit connected to said control winding, said rectifier circuit being disposed such that an output voltage therefrom is superposed upon said first superposed output voltage from said superposing circuit to provide a second superposed output voltage, and a control circuit responsive to said second superposed output voltage for concurrently controlling voltages applied respectively to said gates of said thyristors of said thyristor bridge circuits, to thereby maintain said first superposed output voltage from said superposing circuit at a constant value.

2. An output circuit as claimed in claim 1, further including a field effect transistor having a source terminal and a drain terminal and connected to an output of said superposing circuit, and connectible in series to an external load, for controlling supply of current flowing through said field effect transistor to said external load, and a current cutoff circuit for detecting overcurrent in said output circuit and operable, upon detection of said overcurrent, to cause said field effect transistor to be turned off for cutting off supply of current to said external load.

3. An output circuit as claimed in claim 2, wherein said current cut-off circuit detects said overcurrent by comparing a voltage between said source terminal and said drain terminal of said field effect transistor with a predetermined value.

4. An output circuit as claimed in claim 3, wherein said current cut-off circuit judges that said overcurrent exists if said voltage between said source terminal and said drain terminal exceeds said predetermined value.

5. An output circuit as claimed in claim 4, wherein said current cut-off circuit causes said field effect transistor to be turned off when a predetermined time period elapses from a time point said voltage between said source terminal and said drain terminal exceeds said predetermined value.

6. An output circuit as claimed in claim 4, wherein said current cut-off circuit causes said field effect transistor to be turned off when a state in which said voltage between said source terminal and said drain terminal exceeds a first predetermined value has lasted over a predetermined time period, and immediately causes said field effect transistor to be turned off when said voltage between said source terminal and said drain terminal exceeds a second predetermined value higher than said first predetermined value.

7. An output circuit as claimed in claim 2, including a smoothing capacitance connected to said output of said superposing circuit, in parallel to a series circuit formed of said field effect transistor and said external load, and wherein said current cut-off circuit detects said overcurrent by comparing a voltage across said smoothing capacitance with a predetermined value.

8. An output circuit as claimed in claim 7, wherein said current cut-off circuit judges that said overcurrent exists if said voltage across said smoothing capacitance is below said predetermined value.

9. An output circuit as claimed in any of claims 2 to 8, wherein said current cut-off circuit continues cutting off supply of current to said external load until a resetting action is taken.

10. An output circuit as claimed in claim 9, wherein said generator is connected to an engine to be driven thereby, and wherein said current cut-off circuit causes said field effect transistor to be turned on when the rotational speed of said engine exceeds a predetermined value.

* * * * *